(No Model.)

L. E. WILLEY.
BAKE PAN.

No. 428,792. Patented May 27, 1890.

Witnesses:
Rufus R. Riker
F. R. Riker

Inventor:
L. E. Willey
By T. J. Deavitt
Attorney

UNITED STATES PATENT OFFICE.

LEONARD E. WILLEY, OF BARRE, VERMONT.

BAKE-PAN.

SPECIFICATION forming part of Letters Patent No. 428,792, dated May 27, 1890.

Application filed February 5, 1890. Serial No. 339,369. (No model.)

*To all whom it may concern:*

Be it known that I, LEONARD E. WILLEY, a citizen of the United States, residing at Barre, in the county of Washington and State of Vermont, have invented a new and useful Improvement in Baking-Tins, of which the following is a specification.

My invention relates to a baking tin or dish, of the usual and ordinary size and shape, provided with a loose or removable bottom and loose sides that fall away from the cake or bread when baked, leaving it upon the bottom alone to cool. The side and end pieces composing the dish are loosely attached to a wire in their bottom edge, upon which they swing, and on which the bottom of the utensil rests. Another wire, sliding up and down around on the outside of the dish, as hereinafter described, operates said pieces.

Figure 1:
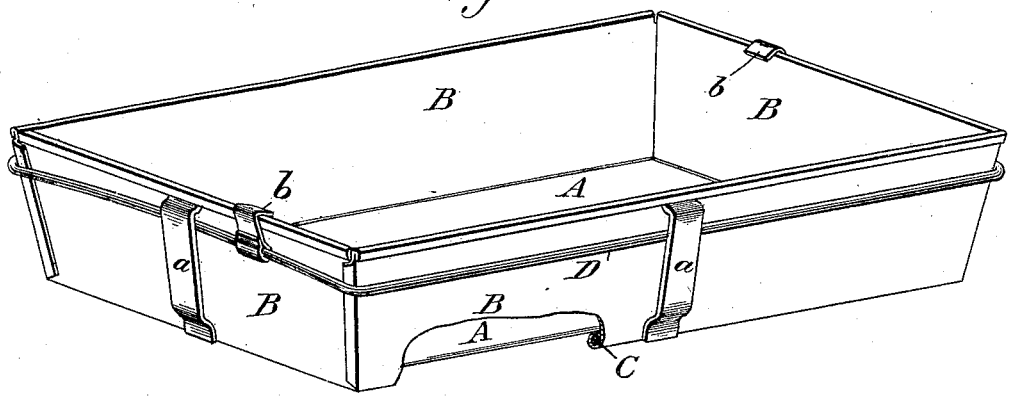
Figure 2:
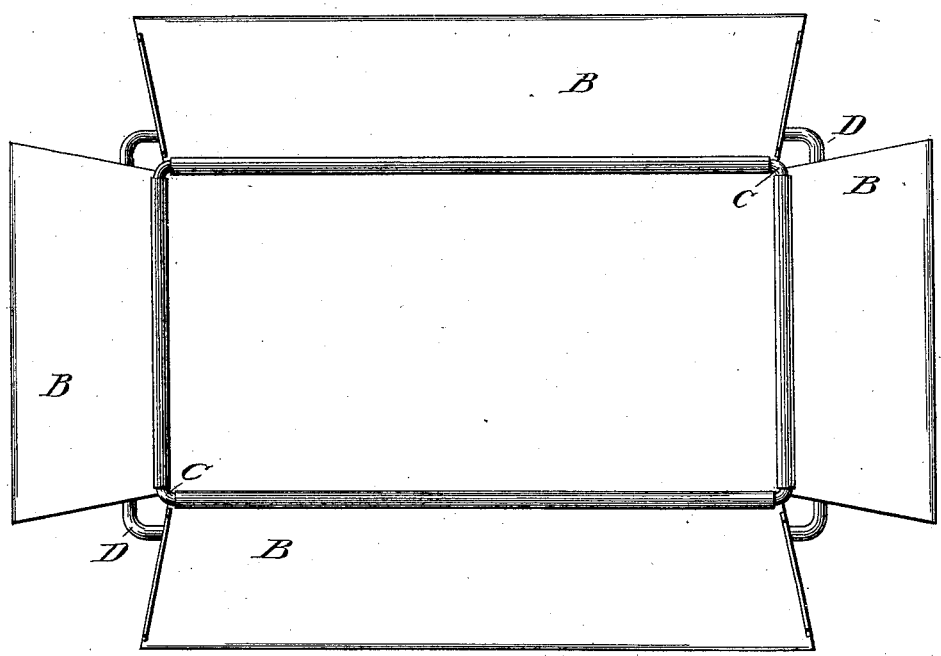

In the accompanying drawings, which are referred to and made a part of this specification, Figure 1 shows my invention as closed, ready to receive the dough for baking. Fig. 2 shows it with the bottom removed and the sides and ends spread, as it appears when taken from the baked loaf or cake.

A in the drawings represents the bottom, and B the sides and ends.

C represents a wire to which the sides and ends are attached in a manner to swing. The wire also, being on the inside of the bottom of the dish, furnishes a projection inward for a rest on which bottom A rests.

D is a wire around the outside of the dish, adapted to slide up and down in loops *a a a a* on the sides and ends B B B B.

*b* is a hook attached to wire D loosely at one end, and hitches onto the top of the dish to hold wire D at the top of the dish.

To use my baking-tin, place the bottom of the dish on the projection made by wire C, slide the outside wire D nearly to the top of the sides B B, and fasten hooks *b b* to the top to hold wire D in place, holding the sides and ends in their place to receive the dough. Place the dish containing the dough in the oven. When bread is baked, remove the dish from the oven and set it on an object smaller than itself, (like a tumbler,) unhitch hook *b b*, and slide wire D downward, which, with the flaring shape of the dish, allows the sides and ends to spread and fall away from the baked cake or loaf, leaving it upon the bottom of the dish.

I do not limit myself to the shape of the dish shown. It may be of any desirable size and shape and made of any suitable material.

Having thus described my invention, what I claim as new, and desire to secure by Letters Patent, is—

1. In a baking-dish, the removable bottom A, in combination with the four horizontally-hinged sides B, substantially as shown, and for the purposes described.

2. A baking-dish composed of the bottom A, sides B, wires C and D, loop *a*, and hooks *b b*, all arranged as shown, and for the purposes described and set forth.

LEONARD E. WILLEY.

Witnesses:
T. J. DEAVITT,
EDWARD H. DEAVITT.